L. S. HOWE.

BOX STRAPPING.

APPLICATION FILED MAR. 21, 1914.

Reissued July 7, 1914.

13,765.

Witnesses:

Chas. A. Pond

Ida Mittinziker

Inventor

L. S. Howe

By his Attorneys

Dorsey, Owen & Munn

UNITED STATES PATENT OFFICE.

LEON S. HOWE, OF HARTFORD, CONNECTICUT, ASSIGNOR TO THE STANLEY WORKS, OF NEW BRITAIN, CONNECTICUT, A CORPORATION OF CONNECTICUT.

BOX-STRAPPING.

13,765. Specification of Reissued Letters Patent. Reissued July 7, 1914.

Original No. 1,043,771, dated November 5, 1912, Serial No. 684,503. Application for reissue filed March 21, 1914. Serial No. 826,397.

*To all whom it may concern:*

Be it known that I, LEON S. HOWE, a citizen of the United States, residing at Hartford, in the county of Hartford and State of Connecticut, have invented a certain new and useful Improvement in Box-Strapping, of which the following is a specification.

My invention relates to metallic box strapping, the main object being to provide an improved construction whereby such strapping may be easily nailed in place on a box, and whereby when in place it will guard the nail head or heads from contact with the floor, so that the box to which the strap is applied may be easily pushed over the floor without scratching or tearing the same.

Box strapping, as ordinarily employed, is made from plain metal strips which are nailed at intervals to the box. In applying such straps, it is most desirable to drive the nail obliquely, so that as the nail is driven in, the draft of each nail will be in a direction to tighten the strap. In view of the smooth surface of the ordinary strap, it is practically impossible to puncture the metal with a nail which stands obliquely when it is being driven. Consequently it is common practice to first puncture the metal by driving the nail through the strap with the nail placed vertically. When the puncture is made, the nail is placed obliquely, as aforesaid, and the driving is continued. The swinging of the nail from the vertical to the oblique position tends to produce some unnecessary slack in the strap, so that the drag of the nail as it is receiving the last few blows, is insufficient to properly tighten the strap.

By my improvement the nail may be placed at an angle to the strap preparatory to puncturing the latter, and may be driven without danger of slippage, every blow on the nail being in a direction to produce a drag on the strap which will take up the slack and cause said strap to hug tightly to the box. These and other advantages will be apparent to the mechanic skilled in this art, from a reading of the following specification.

Figure 1:
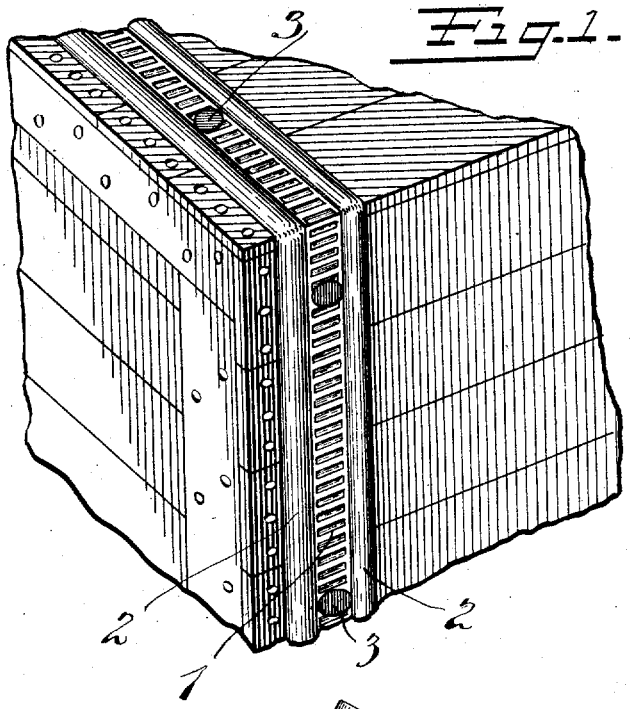
Figure 2:
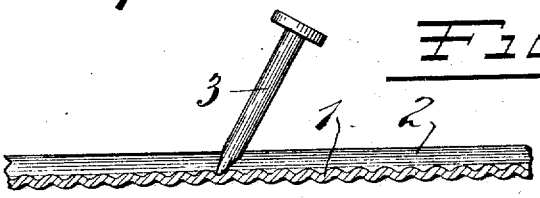
Figure 3:
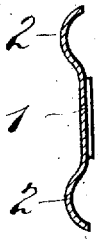

In the drawings Figure 1 represents the corner of a box with my improved strap applied thereto. Fig. 2 is a central longitudinal section of the strap. Fig. 3 is a cross section.

The strap is preferably made from sheet metal and provides a median web portion 1, which is embossed or transversely corrugated so as to increase the overall thickness of the strip along the median portion, for the purpose hereinafter described. At each edge of the web portion 1 there is a longitudinal raised border 2—2, which is preferably formed by corrugating or channeling the strap along opposite edges, as indicated in Fig. 3, so as to produce from a single thickness of metal a smooth convex bearing surface preferably standing well above the outer surface of the web 1. The borders of the strap being relatively smooth will prevent stretching the central web portion 1. 3 represents a nail, which, as shown in Fig. 2, is applied obliquely to the metal strap, the point of the nail being lodged against one of the shoulders of the web 1, whereby the puncturing blow may be given to the nail without danger of slippage, even though said nail stands obliquely. When the nail is fully driven into place, the head will be located between the two raised borders 2—2 and will be protected thereby from contact with the floor when the box rests thereon, so that said box may be moved about without danger of tearing the floor.

The method of producing the strap construction is immaterial to this invention, although ordinarily plain sheet stock would be employed and subjected to pressure sufficient to form the web and the raised borders 2—2.

From the foregoing it is apparent that great economies will be effected in the application of the strip or strap to a box, because the nails may be started at an angle, said nails being inclined in a direction so that blows against the same will be in a direction to tighten the strap on the box, thus securing at once a two-fold advantage resulting from the employment of the transversely corrugated or embossed web.

What I claim is:

1. A metallic box-strap for packing cases and the like, comprising a main body of strip form, both faces of said strip being embossed to increase the overall thickness along the median portion, the shoulders formed by said embossing being adapted to hold the point of a nail to prevent slippage thereof whereby said nail may be driven at an angle relatively to the strip to take up slack therein in the act of applying the same, the borders of said strip being relatively smooth to prevent stretching the embossed median portion.

2. A metallic box-strap for packing cases and the like, comprising a main body of strip form, both faces of said strip being embossed to increase the overall thickness along the median portion, the shoulders formed by said embossing being adapted to hold the point of a nail to prevent slippage thereof whereby said nail may be driven at an angle relatively to the strip to take up slack therein in the act of applying the same, the borders of said strip being relatively smooth to prevent stretching the central portion, said borders being shaped to form raised bearings extending along the opposite edges of said strip.

3. A metallic box-strap for packing cases and the like, comprising a main body of strip form, both faces of said strip being embossed to increase the overall thickness along the median portion, the shoulders formed by said embossing being adapted to hold the point of a nail to prevent slippage thereof whereby said nail may be driven at an angle relatively to the strip to take up slack therein in the act of applying the same, the borders of said strip being relatively smooth to prevent stretching of the embossed central portion, said borders being longitudinally corrugated to form raised bearings from a single thickness of metal.

4. A metallic box-strap for packing cases and the like, comprising a strip, transverse corrugations formed along the median portion thereof to produce substantially roughened surfaces on each face of the strip and to increase the overall thickness thereof along said median portion, the shoulders formed thereby being arranged to hold the point of a nail to prevent slippage thereof whereby said nail may be driven at an angle relatively to said strip to take up slack therein in the act of applying the same, that part of the strip at opposite edges of said corrugated portion being relatively smooth to prevent stretching the central corrugated portion of said strip.

5. A metallic box-strap for packing cases and the like, comprising a strip, transverse corrugations formed along the median portion thereof to produce substantially roughened surfaces on each face of the strip and to increase the overall thickness thereof along said median portion, the shoulders formed by said corrugations being arranged to hold the point of a nail to prevent slippage thereof whereby said nail may be driven at an angle relatively to said strip to take up slack therein in the act of applying the same, that part of the strip at the opposite edges of said corrugated portion being relatively smooth and provided with raised bearings.

6. A metallic box-strap for packing cases and the like, comprising a strip, transverse corrugations formed along the median portion thereof to produce substantially roughened surfaces on each face of the strip and to increase the overall thickness thereof along said median portion, the shoulders formed by said corrugations being arranged to hold the point of a nail to prevent slippage thereof whereby said nail may be driven at an angle relatively to said strip to take up slack therein in the act of applying the same, that part of the strip at the opposite edges of said corrugated portion being relatively smooth and provided with raised bearings, said raised bearings being formed by longitudinal corrugations.

7. A metallic box-strap for packing cases and the like, comprising a strip, transverse corrugations formed along the median portion thereof to produce substantially roughened surfaces on each face of the strip and to increase the overall thickness thereof along said median portion, the shoulders formed by said corrugations being arranged to hold the point of a nail to prevent slippage thereof whereby said nail may be driven at an angle relatively to said strip to take up slack therein in the act of applying the same, that part of the strip at the opposite edges of said corrugated portion being relatively smooth and provided with raised bearings, said bearings being sufficiently raised to extend above the adjacent corrugated median portion of the strip sufficiently to guard the head of a nail driven through said median portion.

LEON S. HOWE.

Witnesses:
S. W. Parsons,
H. P. Carter.